United States Patent
LeCrone et al.

(10) Patent No.: US 10,592,154 B1
(45) Date of Patent: Mar. 17, 2020

(54) ACCESSING DATA PREVIOUSLY MIGRATED TO A CLOUD

(71) Applicant: EMC IP Holding Company LLC, Hopkinton, MA (US)

(72) Inventors: Douglas E. LeCrone, Hopkinton, MA (US); Brett A. Quinn, Lincoln, RI (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/884,958

(22) Filed: Jan. 31, 2018

(51) Int. Cl.
*G06F 3/06* (2006.01)
*H04L 29/08* (2006.01)

(52) U.S. Cl.
CPC .......... *G06F 3/0647* (2013.01); *G06F 3/0619* (2013.01); *H04L 67/1097* (2013.01); *G06F 3/067* (2013.01)

(58) Field of Classification Search
CPC ...... G06F 3/0647; G06F 3/0619; G06F 3/067; H04L 67/1097
See application file for complete search history.

(56) References Cited

U.S. PATENT DOCUMENTS

| | | | | |
|---|---|---|---|---|
| 5,694,568 A * | 12/1997 | Harrison, III | ........... | G06F 9/383 711/137 |
| 6,401,193 B1 * | 6/2002 | Afsar | ...................... | G06F 9/383 711/E12.057 |
| 7,266,538 B1 * | 9/2007 | Shatil | .................. | G06F 12/0862 |
| 9,503,542 B1 * | 11/2016 | Wang | ...................... | H04L 67/06 |
| 9,588,977 B1 * | 3/2017 | Wang | ...................... | G06F 16/13 |
| 2002/0004890 A1 * | 1/2002 | Ofek | ...................... | G06F 3/0607 711/161 |
| 2007/0106849 A1 * | 5/2007 | Moore | .................. | G06F 16/172 711/137 |
| 2013/0262410 A1 * | 10/2013 | Liu | ........................ | G06F 16/116 707/693 |
| 2014/0195633 A1 * | 7/2014 | Carter | .................. | G06F 16/113 709/213 |
| 2014/0365524 A1 * | 12/2014 | Hirzel | ................. | G06F 16/2474 707/776 |
| 2018/0084050 A1 * | 3/2018 | Trachy | ................ | H04L 67/1097 |
| 2018/0084052 A1 * | 3/2018 | Trachy | ................ | H04L 67/1097 |

* cited by examiner

*Primary Examiner* — Francisco A Grullon
(74) *Attorney, Agent, or Firm* — Muirhead and Saturnelli, LLC

(57) ABSTRACT

Accessing a portion of data that was previously migrated to a cloud service includes initiating a recall of the data from the cloud service in response to the data residing entirely on the cloud service, determining if the portion of the data is stored on the storage device, retrieving cloud objects from the cloud service corresponding to the portion of the data in response to the portion of the data being unavailable on the storage device, and accessing the portion of the data on the storage device while cloud objects corresponding to other portions of the data are being transferred from the cloud service to the storage device. The host may receive a migrated status indicator in response to the data existing entirely on the cloud service. Initiating the recall may include modifying metadata to indicate that the data is available for access by the host.

16 Claims, 9 Drawing Sheets

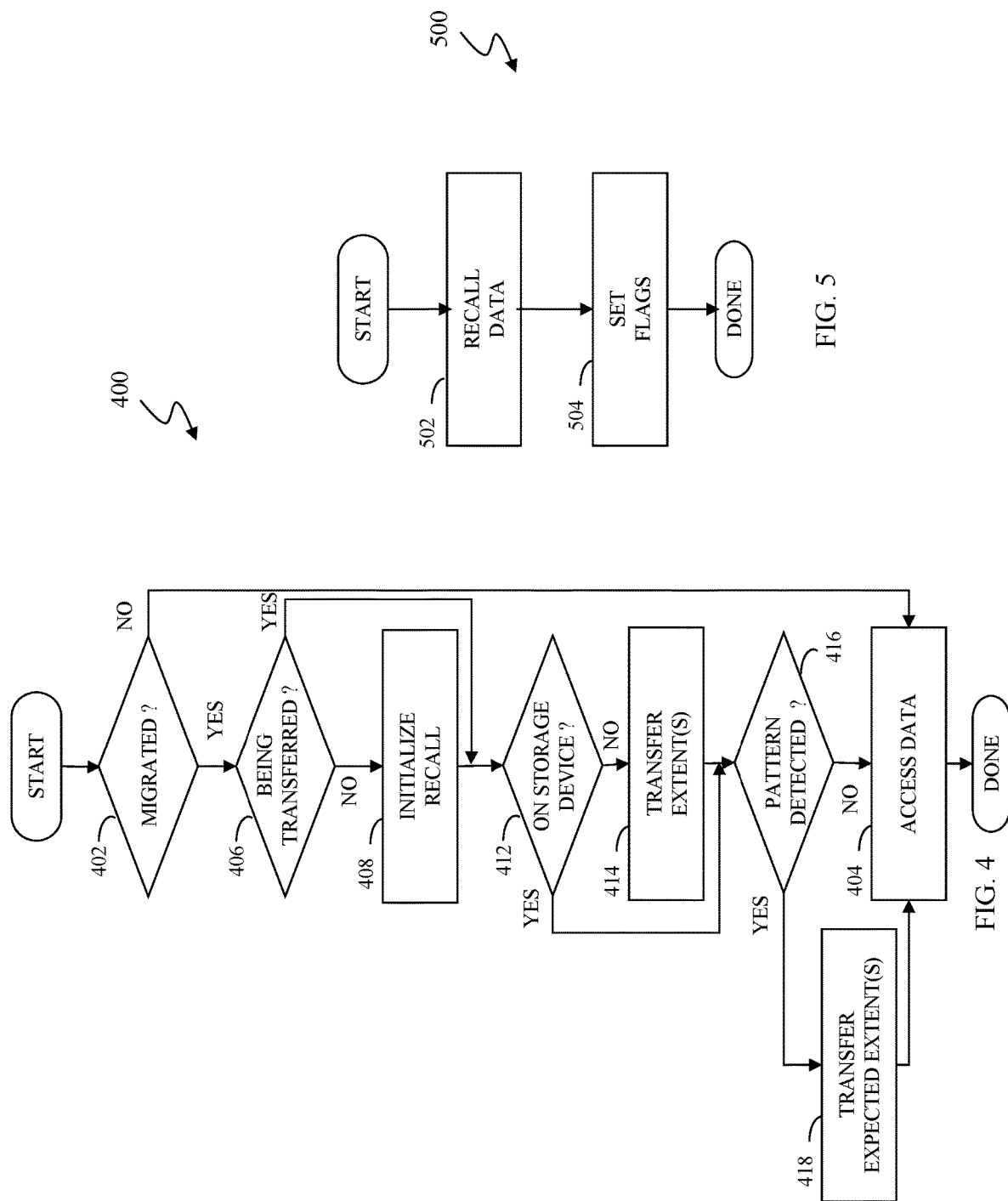

ACCESSING DATA PREVIOUSLY MIGRATED TO A CLOUD

TECHNICAL FIELD

This application relates to the field of computer systems and storage devices therefor and, more particularly, to the field of storage access and I/O operations among computing systems and storage devices.

BACKGROUND OF THE INVENTION

Host processor systems may store and retrieve data using a storage device containing a plurality of host interface units (I/O modules), disk drives, and disk interface units (disk adapters). The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to any one of the actual disk drives. Allowing multiple host systems to access the single storage device unit allows the host systems to share data stored therein.

In some cases, it is desirable to use a cloud service to store and retrieve data. Cloud services generally provide on-demand service, broad network access, resource pooling, and rapid elasticity or expansion, and thus may be beneficial for many storage applications. In some cases, it may be desirable to integrate use of cloud services with use of conventional storage devices. However, often operations on cloud services are very different from operations on conventional storage devices. Furthermore, in some cases, there are operations on storage devices that are not directly available for cloud services and vice versa.

Accordingly, it is desirable to be able to integrate cloud services with conventional storage devices in a way that takes advantage of the strengths of both types of systems while providing for efficient and reliable storage.

SUMMARY OF THE INVENTION

According to the system described herein, accessing a portion of data that was previously migrated to a cloud service includes initiating a recall of the data from the cloud service in response to the data residing entirely on the cloud service, determining if the portion of the data is stored on the storage device, retrieving cloud objects from the cloud service corresponding to the portion of the data in response to the portion of the data being unavailable on the storage device, and accessing the portion of the data on the storage device while cloud objects corresponding to other portions of the data are being transferred from the cloud service to the storage device. A host may access the storage device to obtain the portion of data. The host may receive a migrated status indicator in response to the data existing entirely on the cloud service. Software at the host may intercept access requests to determine if the portion of the data is stored on the storage device. Initiating the recall may include modifying metadata to indicate that the data is available for access by the host. Accessing a portion of data that was previously migrated to a cloud service may also include retrieving cloud objects from the cloud service corresponding to expected portions of the data in response to the expected portions of the data being unavailable on the storage device and detecting an access pattern that anticipates using the expected portions. Retrieving particular cloud objects may include prioritizing transfers of the particular cloud objects over transfers of other ones of the cloud objects. Prior to retrieving cloud objects from the cloud service corresponding to the portion of the data, metadata objects may be retrieved and used to determine particular objects at the cloud service corresponding to the portions of data.

According further to the system described herein, a non-transitory computer readable medium contains software that accesses a portion of data that was previously migrated to a cloud service. The software includes executable code that initiates a recall of the data from the cloud service in response to the data residing entirely on the cloud service, executable code that determines if the portion of the data is stored on the storage device, executable code that retrieves cloud objects from the cloud service corresponding to the portion of the data in response to the portion of the data being unavailable on the storage device, and executable code that accesses the portion of the data on the storage device while cloud objects corresponding to other portions of the data are being transferred from the cloud service to the storage device. A host may access the storage device to obtain the portion of data. The host may receive a migrated status indicator in response to the data existing entirely on the cloud service. Software at the host may intercept access requests to determine if the portion of the data is stored on the storage device. Initiating the recall may include modifying metadata to indicate that the data is available for access by the host. The software may also include executable code that retrieves cloud objects from the cloud service corresponding to expected portions of the data in response to the expected portions of the data being unavailable on the storage device and detects an access pattern that anticipates using the expected portions. Executable code that retrieves particular cloud objects may prioritize transfers of the particular cloud objects over transfers of other ones of the cloud objects. Prior to retrieving cloud objects from the cloud service corresponding to the portion of the data, metadata objects may be retrieved and used to determine particular objects at the cloud service corresponding to the portions of data.

According further to the system described herein, restoring data from a storage device to a cloud service includes initializing each of a plurality of flags for each of a plurality of portions of the data when the data is initially recalled from the cloud service to the storage device, the flags indicating whether a corresponding portion of the data has been modified while being stored on the storage device, modifying a particular one of the flags in response to a corresponding one of the portions being modified, transferring only portions of the data having corresponding flags that have been modified to migrate, and merging the portions of the data with remaining data at the cloud service. Data that is recalled from the cloud service to the storage device may be maintained on the cloud service. The portions of data that are transferred from the storage device to the cloud service may overwrite data maintained at the cloud service. Prior to writing to the storage device, existing data thereon may be copied to a storage pool. Restoring data from a storage device to a cloud service may also include retrieving a point-in-time version of the data using the flags and data in the storage pool. The flags may be Boolean values. The flags may be a byte or an n-bit data word, where n may be sixteen.

According further to the system described herein, a non-transitory computer readable medium contains software that restores data from a storage device to a cloud service. The software includes executable code that initializes each of a plurality of flags for each of a plurality of portions of the data when the data is initially recalled from the cloud service to the storage device, the flags indicating whether a corresponding portion of the data has been modified while being stored on the storage device, executable code that modifies a particular one of the flags in response to a corresponding one of the portions being modified, executable code that transfers only portions of the data having corresponding flags that have been modified to migrate, and executable code that merges the portions of the data with remaining data at the cloud service. Data that is recalled from the cloud service to the storage device may be maintained on the cloud service. The portions of data that are transferred from the storage device to the cloud service may overwrite data maintained at the cloud service. Prior to writing to the storage device, existing data thereon may be copied to a storage pool. The software may also include executable code that retrieves a point-in-time version of the data using the flags and data in the storage pool. The flags may be Boolean values. The flags may be a byte or an n-bit data word, where n may be sixteen.

According further to the system described herein, archiving data from a storage device to a cloud service includes obtaining metadata corresponding to the data, creating a metadata object using the metadata, transferring the metadata object to a cloud service, and transferring the data to a cloud service according to information provided by the metadata. The data being archived may correspond to a dataset or a volume. The metadata may include volume table-of-contents information, information indicating a type of a device containing the data, and information indicating a size of the data. Archiving the data to a cloud service may include writing the data to an appliance that provides access to the cloud service. The appliance may be coupled directly to the storage device or provided by software running on the storage device. Restoring data archived to the cloud service may include determining if a target for restoring the data has a sufficient size. Restoring data archived to the cloud service may include initially restoring the metadata object to determine the sufficient size.

According further to the system described herein, a non-transitory computer readable medium contains software that archives data from a storage device to a cloud service. The software includes executable code that obtains metadata corresponding to the data, executable code that creates a metadata object using the metadata, executable code that transfers the metadata object to a cloud service, and executable code that transfers the data to a cloud service according to information provided by the metadata. The data being archived may correspond to dataset or a volume. The metadata may include volume table-of-contents information, information indicating a type of a device containing the data, and information indicating a size of the data. Archiving the data to a cloud service may include writing the data to an appliance that provides access to the cloud service. The appliance may be coupled directly to the storage device or provided by software running on the storage device. Restoring data archived to the cloud service may include determining if a target for restoring the data has a sufficient size. Restoring data archived to the cloud service may include initially restoring the metadata object to determine the sufficient size.

BRIEF DESCRIPTION OF THE DRAWINGS

Embodiments of the system are described with reference to the several figures of the drawings, noted as follows.

FIG. 4 is a flow diagram illustrating processing performed in connection with providing access to data that had been previously migrated to a cloud service according to an embodiment of the system described herein.

FIG. 5 is a flow diagram illustrating processing performed in connection with recalling data from a cloud service to a storage device according to an embodiment of the system described herein.

DETAILED DESCRIPTION OF VARIOUS EMBODIMENTS

Figure 1:
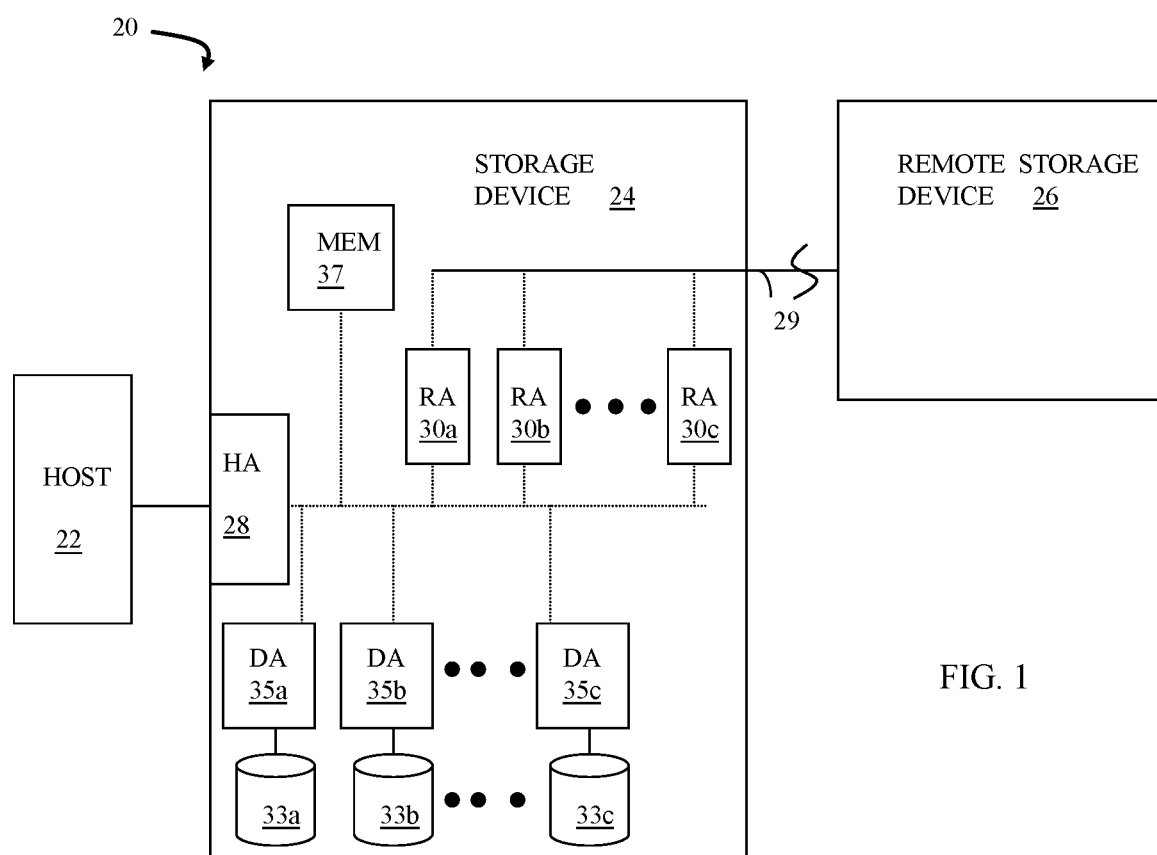
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix or VMAX storage system produced by Dell EMC of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 only shows one host 22 and one HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include one or more disks (including solid state storage), each containing a different portion of data stored on each of the storage device 24. FIG. 1 shows the storage device 24 having a plurality of disks 33a, 33b, 33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. An internal data path exists between the DA's 35a-35c, the HA 28 and the RA's 30a-30c of the storage device 24. Note that, in other embodiments, it is possible for more than one disk to be serviced by a DA and that it is possible for more than one DA to service a disk. The storage device 24 may also include a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and/or the RA's 30a-30c, and may contain a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 may be subdivided into a plurality of volumes or logical devices, where each of the logical devices may or may not correspond to one or more disks of the remote storage device 26.

Figure 2:
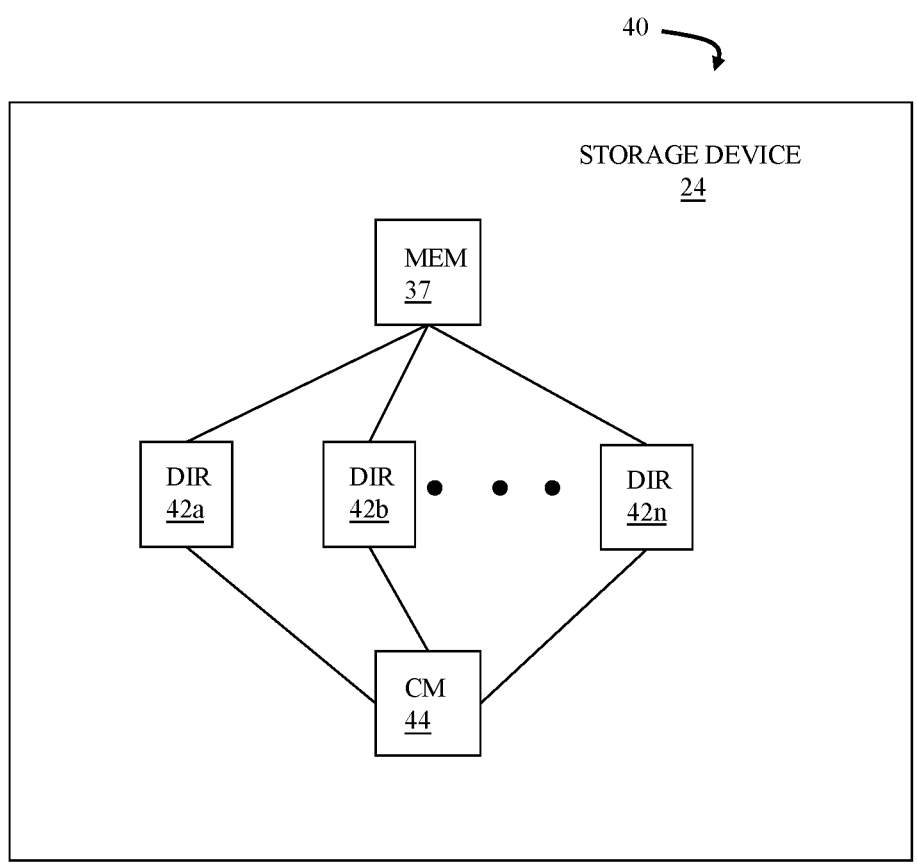
FIG. 2 is a schematic diagram illustrating an embodiment of the storage device where each of a plurality of directors are coupled to the memory.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 26. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Figure 3:
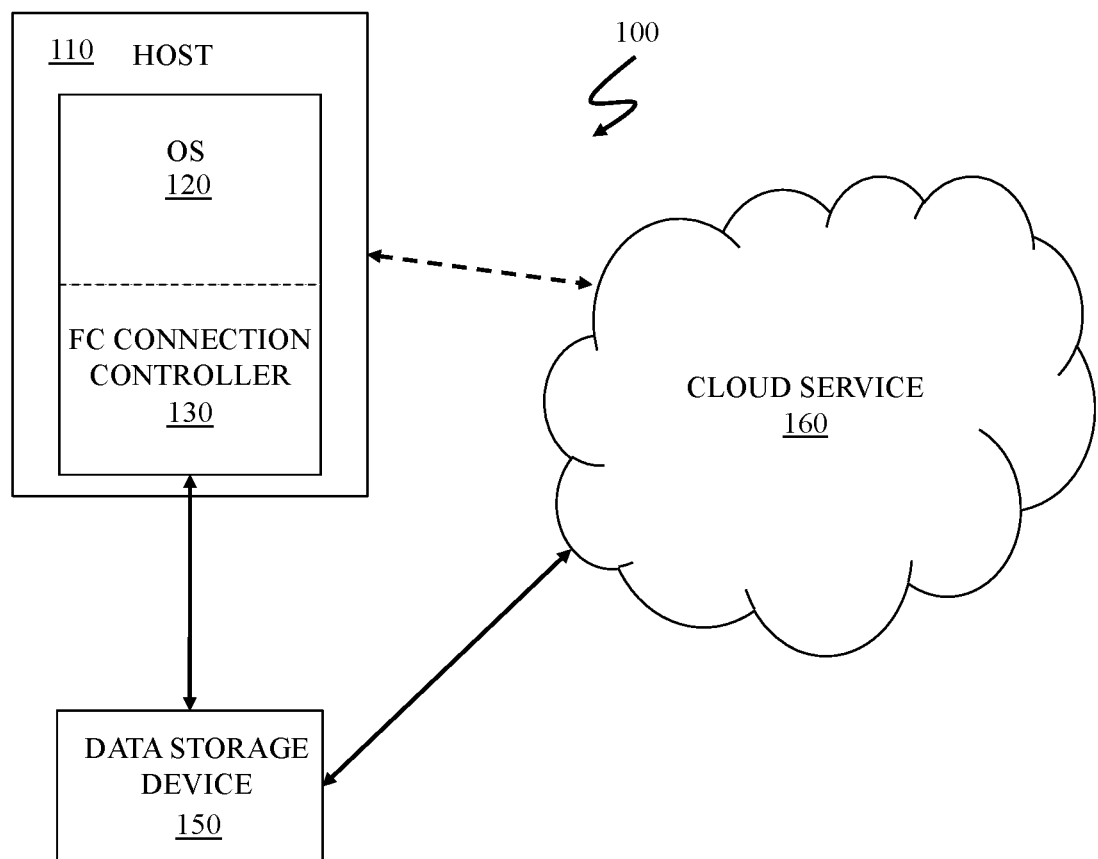
FIG. 3 is a schematic illustration showing a system with a host, a data storage device, and a cloud service according to an embodiment of the system described herein.

FIG. 3 is a schematic illustration showing a system 100 with a FICON connection controller 130 for providing FICON connection between a host 110 and a data storage device 150 according to an embodiment of the system described herein. In an embodiment, the host 110 may be a computer running Linux, z/OS or some other appropriate operating system 120. The I/O processing on the host 110 may operate with the FICON connection controller 130 to enable I/O operations with the data storage device 150. The FICON connection controller 130 may send and receive data to and from the data storage device 150 using any appropriate connection mechanism that may include a network (such as the Internet, and appropriate connection thereof). The data storage device 150 may include physical storage volumes and/or logical volumes, such the Symmetrix/VMAX data storage systems, mentioned above. The FICON connection controller 130 may act as an I/O subsystem providing FICON communication capability. The data storage device 150 may include features and/or components enabling the Fibre channel communication with the host 110. For a discussion of features and implementations of FICON systems and suitable Fibre channel protocols operating therewith on z/Architecture computing systems, reference is made to J. Entwistle, "IBM System z10 FICON Express8 FCP Channel Performance Report," Technical paper, Aug. 2009, 27 pp., which is incorporated herein by reference.

It is noted that various components of the system 100 may be emulated. For further discussion of emulation of I/O computing components, particular Fibre Channel connection components, reference is made to U.S. Pat. No. 9,665,502 to Jones et al., entitled "Virtual I/O Hardware" and U.S. Pat. No. 9,170,984 to LeCrone et al., entitled "I/O Fault Injection Using Simulated Computing Environments,"

which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism between the host 110 and the data storage device 150 may include an Internet connection and/or possibly some other types of connection(s). In an embodiment herein, the connection mechanism may be directly incompatible with a FICON connection on at least one end of the connection and thus may rely on a FICON emulator (and/or other emulator(s)) for providing data in an appropriate format. It is further noted that where FICON emulation is being performed, the data storage device 150 may include or be coupled to a FICON emulator portion that may send and receive data to and from the connection mechanism and also emulates a Fibre Channel FCO physical layer for the benefit of the data storage device 150. Thus, in such case involving emulation, both the host 110 and the data storage device 150 may operate as if the devices 110, 150 were communicating directly using a FICON hardware connection.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol. zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

The system 100 also includes a cloud service 160, which is coupled to the storage device using, for example, a conventional TCP/IP connection therebetween, although other types of connections may be used. In some instances, described in detail elsewhere herein, the cloud service 160 may also exchange data with the host 110 using, for example, a TCP/IP connection. In other embodiments, the host 110 does not communicate directly with the cloud service 160. The cloud service 160 may be a public commercially-available cloud storage, such as the AWS cloud computing system provided by Amazon Web Services, Inc., the IBM Cloud, etc. The cloud service 160 could also be implemented with one or more private cloud services implemented by an organization for use by members only. The cloud service 160 could also be implemented using a combination of one or more public cloud systems with one or more private cloud systems. Generally, the cloud service 160 provides on-demand service, broad network access, resource pooling, and rapid elasticity or expansion.

In an embodiment herein, data that is initially stored on the data storage device 150 by the host 110 may be selectively migrated to the cloud service 160. In some cases, the data may be migrated automatically based on predetermined criteria or heuristics. For example, the data on the storage device 150 may be transferred to the cloud service 160 in response to the data not being accessed for a certain amount of time (e.g., 30 days). It is also possible for user to explicitly request that the data be transferred. In some instances, data is transferred from the storage device 150 to the cloud service 160 both automatically and at the explicit direction of a user. Data that is migrated may be an entire volume, a specific dataset (file), or any other quantum of data that may be chosen based on appropriate criteria and possibly based, in part, by the nature and use of the data.

The specific mechanism/commands for transferring the data are implementation specific. In an embodiment herein where the host 110 is running the z/OS operating system, migrating data from the storage device 150 to the cloud service 160 may be performed as follows:

1) Collect metadata information (e.g., DSCB/NVR/VVR) and extent ranges for the data.

2) Transfer the metadata from #1. Note that the actual data may be passed in a CCW (Channel Command Word).

3) Transfer the CKD Objects (volume and extent ranges sent in the CCW) and corresponding track data to the cloud service 160.

4) Re-catalog the file as MIGRATC (or similar) indicating that the file has been migrated from the storage device 150 to the cloud service 160. Information about the cloud service 160 (e.g., Cloud name, Account name, Container name, and Object name) may be stored in metadata of the storage device 150 to indicate the data is stored in the cloud service 160. The specific type of metadata depends on the implementation and includes, for example, the DFHSM Control Data Set for an IBM storage system.

6) Delete the file from the storage device 150.

If the data is subsequently accessed by the host 110, the storage device 150 indicates to the host 110 that the data has been migrated to the cloud service 160 (e.g., by indicating that the data/file has a MIGRATC status). In response thereto, the host 110 causes the data to be recalled from the cloud service 160 back to the storage device 150. In an embodiment herein, the recall may be performed as follows:

1) Use the information about the cloud service 160 that was previously stored (step #4, above) to retrieve the metadata that was stored in the cloud service 160.

2) Use the metadata to allocate file space on the storage device 150 with original attributes of the data/file that transferred to the cloud service 160. In some cases, volume and extent(s) information will be different from volume and extent(s) information of the data/file prior to being transferred to the cloud storage service 160.

3) Retrieve CKD objects for the file until all of the data is restored.

4) Allow processes/applications on the host 110 to access the data/file.

Conventionally, processes and applications on the host 110 do not access the data/file until the entirety thereof has been transferred from the cloud service 160 to the data storage device 150. While this is not problematic for relatively small files, waiting to access a relatively large file until the entire file has been transferred to the storage device 150 could introduce unacceptable delays. The system described herein allows accessing data without needing to wait for the entirety of a file to first be transferred from the cloud service 160 to the storage device 150.

Referring to FIG. 4, a flow diagram 400 illustrates processing performed in connection with providing access to data that had been previously migrated to the cloud service 160. The processing illustrated by the flow diagram 400 is executed whenever the host 110 accesses (reads/writes) data. In an embodiment herein, the processing illustrated by the flow diagram 400 is provided by a program/process that runs on the host 110 and intercepts/replaces (possibly at the driver level) data access commands executed by applications running on the host 110.

Processing for the flow diagram 400 begins at a test step 402 where it is determined if the data being accessed exists on the cloud service 160 (e.g., the data/file has been designated with the MIGRATC status, or similar, described above). If not, then control transfers from the test step 402 to a step 404 where the data, which is on the storage device 150, is accessed in a conventional fashion. Following the step 404, processing is complete. Note that it is possible for data to have previously migrated to the cloud service 160 and subsequently recalled back to the storage device 150 prior to being accessed by the host 110.

If it is determined at the test step 402 that the data being access has been migrated to the cloud service 160, then control transfers from the test 402 to a test step 406 where it is determined if the data is currently being recalled (i.e., is currently subject to a recall operation, as described elsewhere herein). If not, then control transfers from the test step 406 to a step 408 where a recall operation is initiated. Initiating the recall operation at the step 408 may include modifying metadata to indicate that the file/data is available for access by the host 110. Following the step 408 is a test step 412 where it is determined if the data being accessed is already on the storage device 150 (i.e., has already been transferred from the cloud service 160 to the storage device 150 as part of the ongoing recall operation). If so, then control transfers from the test step 412 to the step 404, discussed above, where the data is conventionally accessed. Following the step 404, processing is complete.

If it is determined at the test step 412 that the data being accessed has not already been transferred to the storage device, then control transfers from the test step 412 to a step 414 where one or more cloud objects corresponding to one or more extents containing the desired data are transferred from the cloud service 160 to the storage device 150. In an embodiment herein, metadata objects are initially retrieved from the cloud service 160. The metadata objects are then used to determine particular extents (objects) corresponding to the data of interest that is being accessed. Following the step 414 is a test step 416 where it is determined if a data access pattern is detected. In an embodiment herein, the system detects if there is a discernable pattern with respect to how data is being accessed (e.g., sequentially). If a pattern is detected at the step 416, then control transfers from the step 416 to a step 418 where one or more cloud objects corresponding to one or more expected objects containing the data that is anticipated to be used (based on the detected pattern) are transferred from the cloud service 160 to the storage device 150. Following the step 418 is the step 404, described above, where the data/file is accessed from the storage device 150 in a conventional fashion. Note that the step 404 is also reached directly from the step 416 if no pattern is detected. Following the step 404, processing is complete. Note that data of interest may be accessed at the step 404 or at the step 418 while other data is still being transferred from the cloud service 160 to the storage device 150 in connection with the initialize recall operation at the step 408. Note also that processing at the steps 404, 418 may simply prioritize transfers for particular objects corresponding to data of interest so that the particular objects are transferred before other, non-prioritized, objects.

In conventional systems, a file (dataset) that is recalled from a cloud service to a storage device is modified while on the storage device and then the entire dataset is migrated back to the cloud service. While this may be a relatively straight-forward implementation, it may result in inefficiencies in cases where a dataset is relatively large, only but relatively small portions thereof are modified while the dataset is presented on the storage device.

Referring to FIG. 5, a flow diagram 500 illustrates steps performed in connection with recalling data (e.g., a file or dataset) from the cloud service 160 to the storage device 150. Processing begins at a first step 502 where the data is recalled from the cloud service 160 to the storage device 150, as described elsewhere herein. Following the step 502 is a step 504 where flags are set for each of the portions of the data stored on the storage device 150. As discussed in more detail elsewhere herein, the flags are used to indicate which of the portions of the data have been modified while the data is available on the storage device 150. The portions could be any increment of data that is useful for tracking changes to the data. In an embodiment herein, each portion could be a track of data so that, if any data within the track of data is modified, a corresponding flag for the track would indicate that the track has been modified. In addition, although any appropriate flag mechanism may be used for the flags (e.g., array of Boolean values), in an embodiment herein, the flag mechanism uses the SDDF (Symmetrix called Symmetrix Differential Data Facility) mechanism, which is provided by Dell EMC of Hopkinton, Mass. and described in U.S. Pat. No. 8,959,305 to LeCrone, et al. entitled "SPACE RECLAMATION WITH VIRTUALLY PROVISIONED DEVICES", which is incorporated by reference herein. With SDDF, each of the flags may be represented using a value (e.g., a byte or an n-bit data word, where n could be, for example, sixteen), each bit of the value indicates modification of the corresponding portion at a different time. Following the step 504, processing is complete.

Figure 6:
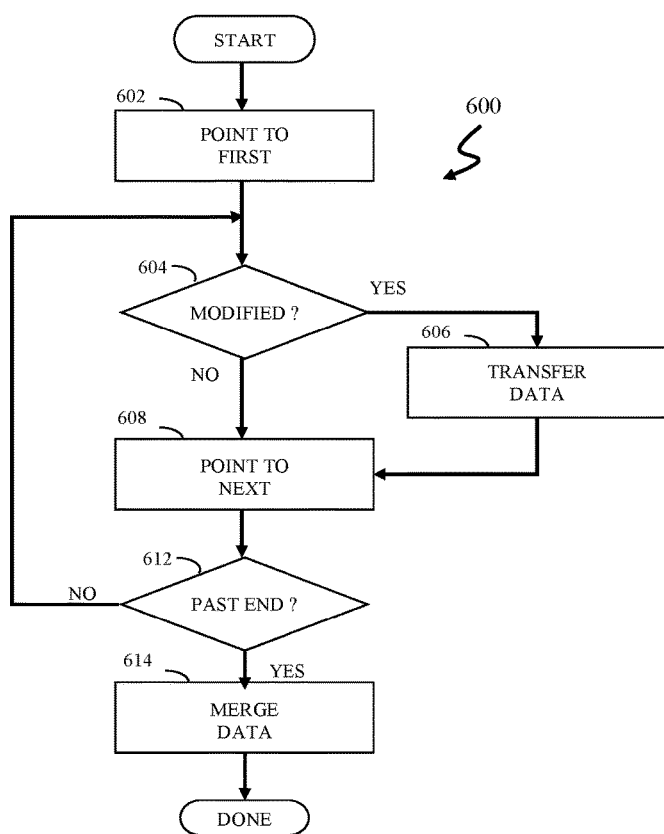
FIG. 6 is a flow diagram illustrating processing performed in connection with transferring data from a storage device to a cloud service according to an embodiment of the system described herein.

Referring to FIG. 6, a flow diagram 600 illustrates processing performed in connection with transferring data from the storage device 150 to the cloud service 160. Processing illustrated by the flow diagram 600 corresponds to step #3, above, in the description for migrating data from the storage device 150 to the cloud service 160. The processing illustrated by the flow diagram 600 is based on a system where the file/dataset that is recalled is maintained (not deleted) at the cloud service 160 after the recall so that only changed data needs to be transferred back to the cloud service 160 in connection with a subsequent migration of the file/dataset. The changed data may overwrite exiting, superseded, data at the cloud service 160, as described elsewhere herein. In some embodiments, the data at the cloud service 160 may eventually be erased after a certain amount of time has passed (e.g., two weeks) without having transferred the data back to the cloud service 160.

Processing begins at a first step 602 where an iteration pointer, which iterates through all of the portions of the data (e.g., tracks) is initialized to point to the first portion. Following the step 602 is a test step 604 where it is determined if the portion indicated by the iteration pointer has been modified since being transferred (recalled) from the cloud service 160 to the storage device 150. The determination at the step 604 may be performed by examining the flags, which were set at the step 504, described above, when the data was initially recalled from the cloud service 160. In an embodiment herein, the flags for each of the portions are initialized to a first state when the data is first recalled and then, when a write operation occurs to particular portion, a corresponding flag for the particular portion is set to a different state.

If it is determined at the test step 604 that the portion indicated by the iteration pointer has been modified since being transferred (recalled) from the cloud service 160 to the storage device 150, then control transfers from the test step 604 to a step 606 where the corresponding portion is transferred from the storage device 150 to the cloud service. Following the step 606 is a step 608 where the iteration pointer is incremented. Note that the step 608 may also be reached directly from the step 604 if it is determined at the test step 604 that the portion indicated by the iteration pointer has not been modified since being transferred (recalled) from the cloud service 160 to the storage device 150. Following the step 608 is a test step 612 where it is determined if the iteration pointer points past the end of the data (i.e., all of the tracks have been processed). If not, then control transfers from the test step 612 back to the step 604, described above, for another iteration. Otherwise, control transfers from the step 612 to a step 614 where data that was transferred at the step 606 is merged with data that remains at the cloud service 160 (i.e., data that was not modified at the storage device 150). Following the step 614, processing is complete.

Note that keeping track of data that has changed at the storage device 150 and maintaining the original data at the cloud service 160 allows the data at the storage device 150 to be efficiently reverted to an original form (i.e., a state of the data following the initial recall from the cloud storage 160). Reverting the data involves scanning the flags for the portions of data and, for each portion that has been modified at the storage device 150, transferring a corresponding portion from the cloud service 160.

In some instances, it may be useful to keep track of different point-in-time versions (snapshots) of the data/file that has been recalled from the cloud service 160 to the storage device 150. In an embodiment herein, it is straightforward to combine the mechanism described above in connection with FIG. 5 and FIG. 6 with the mechanism for maintaining different versions of data described in U.S. Pat. No. 7,249,130 to Vishlitzky, et al. entitled "VIRTUAL STORAGE DEVICES", which is incorporated by reference herein. This is described in more detail below.

Figure 7:
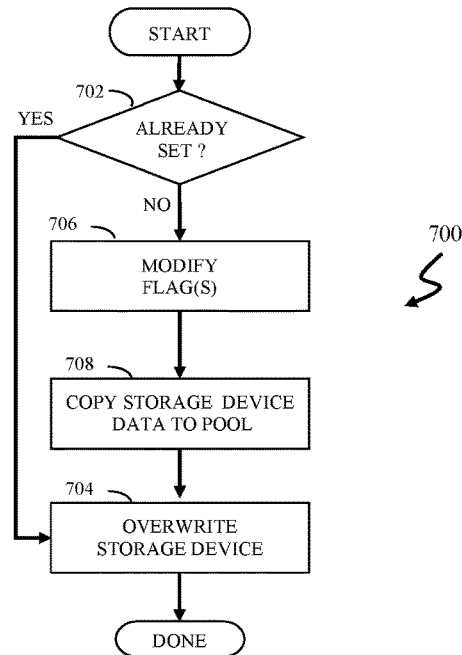
FIG. 7 is a flow diagram illustrating processing performed in connection with handling write operations to a dataset that has been recalled from a cloud service to a storage device according to an embodiment of the system described herein.

Referring to FIG. 7, a flow diagram 700 illustrates steps performed in connection with handling write operations to a dataset that has been recalled from the cloud service 160 to the storage device 150. Processing begins at a first step 702 where it is determined if flag(s) for each of the portions (e.g., tracks) to which the write operation is being performed have already been set (i.e., here was a prior write to the portion after the recall). If so, then processing proceeds from the test step 702 to a step 704 where the data that is being written overwrites the portion on the storage device. That is, at the step 704, a conventional write operation to the storage device 150 is performed. Following the step 704, processing is complete.

If it is determined at the step 702 that flag(s) for the portion(s) to which the write operation is being performed have not been set, then control transfers from the test step 702 to a step 706 where the flag(s) for each of the portion(s) to which the write operation is being performed are set. In an embodiment herein, the flags may be Boolean values that are initially set to FALSE when the dataset is first recalled from the cloud service 160 to the storage device 150 and are set to true in response to a write operation. It also possible for each flag to have multiple Boolean variables associated therewith where each variable represents a write at a particular time or in a particular sequence. For example, each flag for each portion could be a byte where the first bit is one or zero to indicate a write in a first hour, the second bit is one or zero to indicate a write in a second hour, etc. Following the step 706 is a step 708 where data on the storage device 150 that is about to be overwritten is copied to another location, such as a pool, where it is preserved. Following the step 708 is the step 704, described above, where a conventional write operation to the storage device 150 is performed. Following the step 704, processing is complete.

Figure 8A:
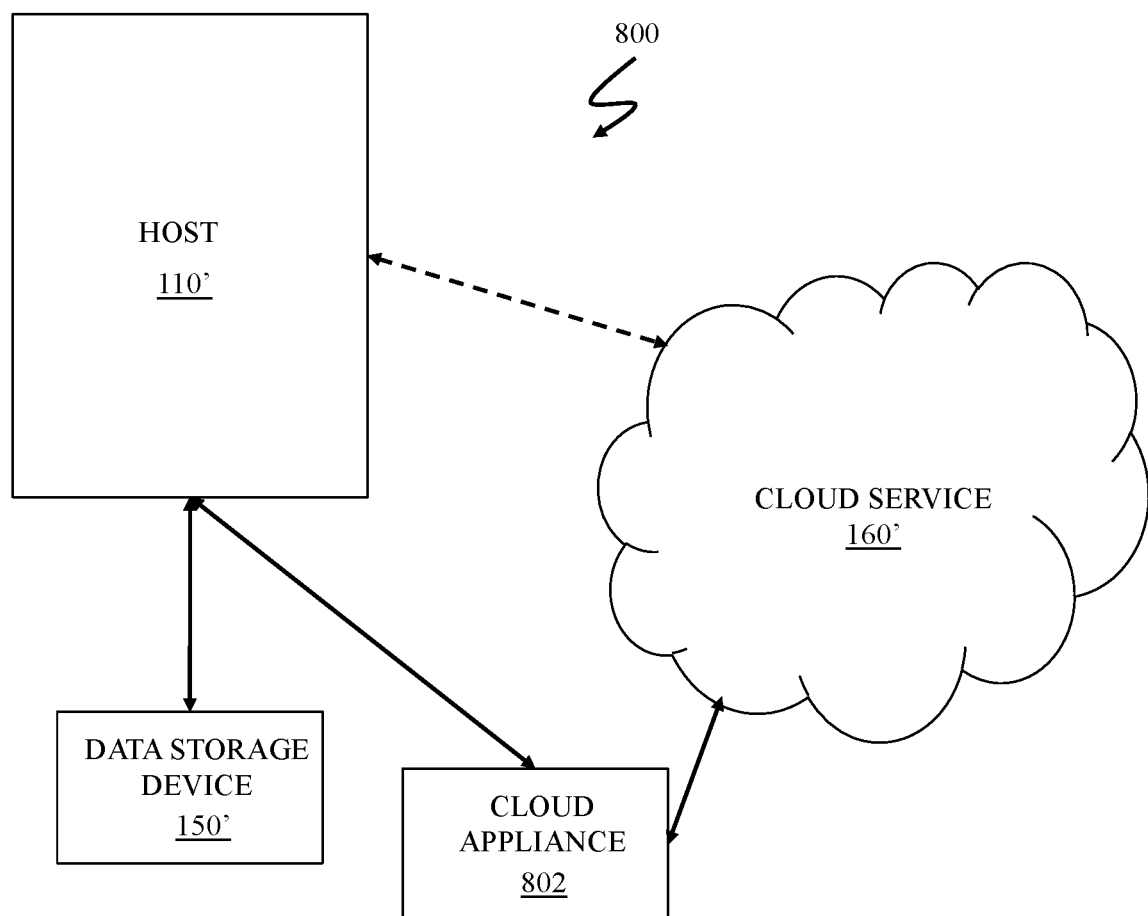
FIGS. 8A-8C are schematic illustrations showing a system with a host, a data storage device, an appliance for providing cloud service access, and a cloud service according to an embodiment of the system described herein.

Referring to FIG. 8A, a diagram 800 illustrates an alternative system that includes a host 110' that is similar to the host 110 described elsewhere herein in connection with FIG. 3. The host 110' is coupled to a storage device 150' that is similar to the storage device 150 described elsewhere herein in connection with FIG. 3. The host 110' is also coupled to a cloud appliance 802, such as the EMC Symmetrix VMAX Cloud Edition appliance (commercially available from Dell EMC of Hopkinton, Mass.,), which is coupled to a cloud service 160' that is similar to the cloud service 160 described elsewhere herein in connection with FIG. 3. The cloud appliance 802 may be connected to the host 110' using a TCP/IP connection (or similar) and may exchange data with the cloud service 160'. In some embodiments, it is possible to have a connection (e.g., a TCP/IP connection) directly between the host 110' and the cloud service 160' for directly transferring data therebetween. In other embodiments, the host 110' does not communicate directly with the cloud service 160'.

The cloud service 160' may be a public commercially-available cloud storage, such as the AWS cloud computing system provided by Amazon Web Services, Inc., the IBM Cloud, etc. The cloud service 160' could also be implemented with one or more private cloud services implemented by an organization for use by members only. The cloud service 160' could also be implemented using a combination of one or more public cloud systems with one or more private cloud systems. Generally, the cloud service 160' provides on-demand service, broad network access, resource pooling, and rapid elasticity or expansion.

The appliance 802 acts as a gateway to the cloud service 160' when accessed by the host 110'. The appliance 802 does not generally have data stored thereon. Instead, the appliance 802 stores data to the cloud storage 160' and retrieves data from the cloud storage 160' using cloud access operations, such as put object, get object, etc. Software at the host 110' may facilitate access of the appliance 802 by applications at the host 110'. For example, driver code (or similar) may provide an appropriate interface so that the appliance 802 appears to applications at the host 110 to be a storage device that supports, for example, CKD data. In such a case, applications at the host 110' accesses datasets (files) and volumes through the appliance 802 in a manner similar to the host 110' accessing datasets (files) on the storage device 150'.

In an embodiment of the system described herein, the host 110' may perform conventional storage tiering of data where data that is accessed relatively frequently is stored on the storage device 150' and data that is accessed relatively infrequently is stored on the cloud service 160' using the appliance 802 so that the host 110' uses tiering software that moves data between storage devices. That is, since the appliance 802 appears to applications at the host 110' as a storage device, a data tiering mechanism (e.g., software)

provided on the host 110' moves data between what appear to the tiering software to be conventional storage devices. However, any data written to the appliance 802 by the host 110' is written, by the appliance 802, to the cloud storage 160' and any data read from the appliance 802 is read, by the appliance 802, from the cloud storage 160'.

Figure 8B:
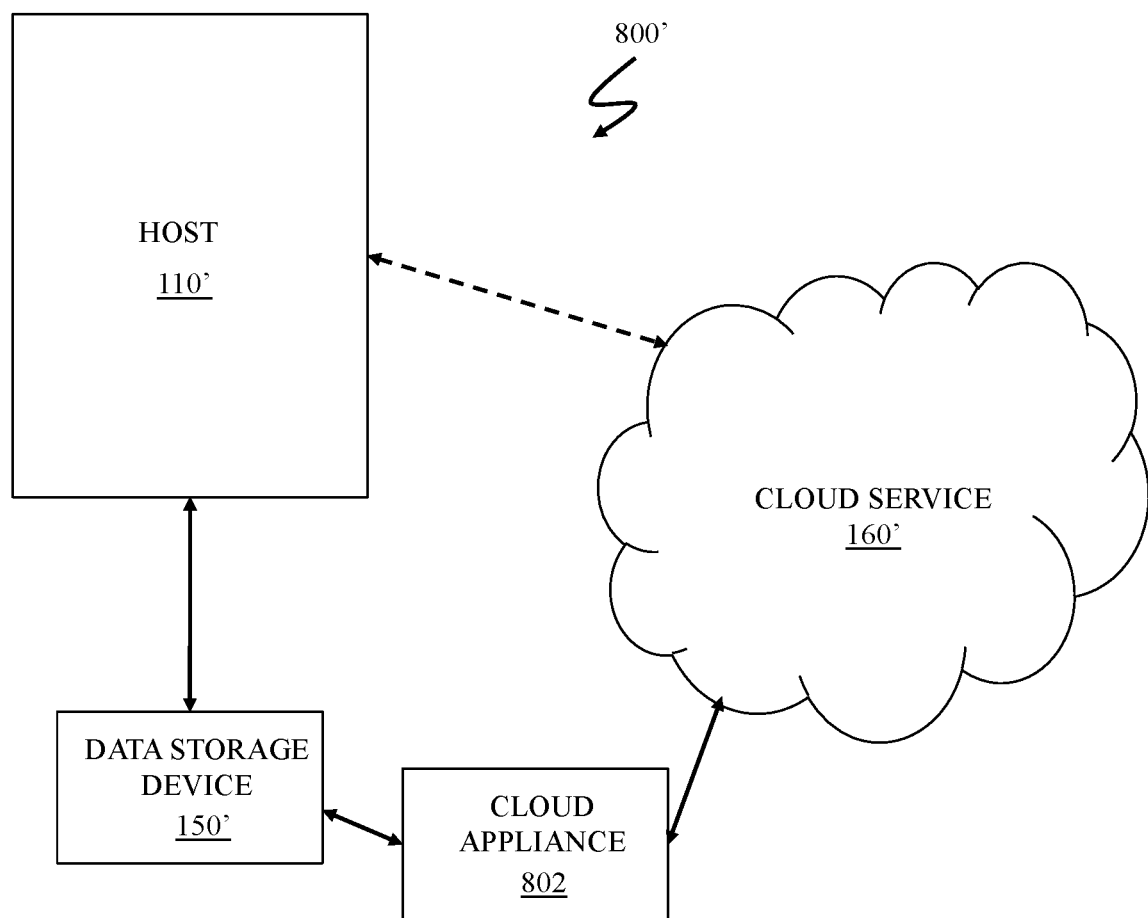

Referring to FIG. 8B, a diagram 800' illustrates an alternative embodiment where the cloud appliance 802 is coupled to the data storage device 150' rather than the host 110'. In such a case, the cloud appliance 802 is not directly accessible from the host 110'. However, in some embodiments, the host 110' may provide instructions to the data storage device 150' that cause the data storage device 150' to exchange data with the cloud service 160' using the cloud appliance 802. For example, the host 110' may have tiering software that causes the host 110' to provide instructions to the data storage device 150' to move data therefrom to a different tier. In response thereto, the data storage device 150' may exchange data with the cloud service 160' using the cloud appliance 802. In some embodiments, data is exchanged between the storage device 150' and the cloud service 160' without any need to pass through or use processing resources of the host 110'. Note that it is possible that data tiering is performed automatically by the storage device 150' using the cloud appliance 802 and the cloud service 160' so that the host 110' is not involved and is not aware of any data tiering.

Figure 8C:
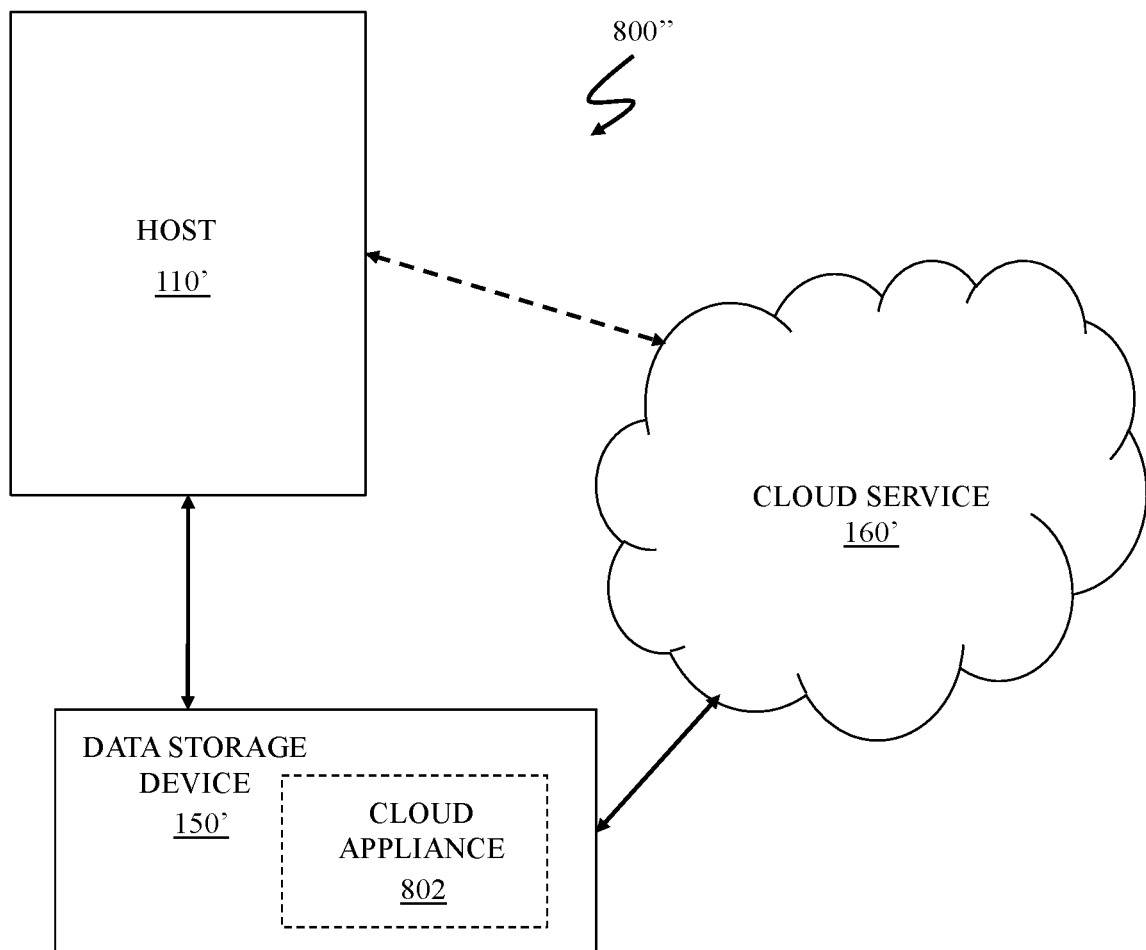

Referring to FIG. 8C, a diagram 800" illustrates an alternative embodiment where the cloud appliance 802 internal to the data storage device 150' and thus, may be implemented using software within the data storage device 150'. In such a case, the data storage device 150' may be directly coupled to the cloud service 160' and may communicate with the cloud service 160' using the cloud appliance. The cloud appliance 802 may not directly accessible from the host 110', but the host 110' may provide instructions to the data storage device 150' that cause the data storage device 150' to exchange data with the cloud service 160' using the cloud appliance 802. For example, the host 110' may have tiering software that causes the host 110' to provide instructions to the data storage device 150' to move data therefrom to a different tier. In response thereto, the data storage device 150' may exchange data with the cloud service 160' using the cloud appliance 802. In some embodiments, data is exchanged between the storage device 150' and the cloud service 160' without any need to pass through or use processing resources of the host 110'. Note that it is possible that data tiering is performed automatically by the storage device 150' using the cloud appliance 802 and the cloud service 160' so that the host 110' is not involved and is not aware of any data tiering.

In some cases, it may be useful to separate metadata from data when archiving a volume (or some other data increment) so that information about the volume may be accessed without needing to retrieve the entire volume. For example, for a z/OS volume, it would be useful to be able to access the volume table of contents (VTOC) without having to restore the entire volume so that, for example, a program on the host 110' may obtain information about a specific dataset.

Figure 9:
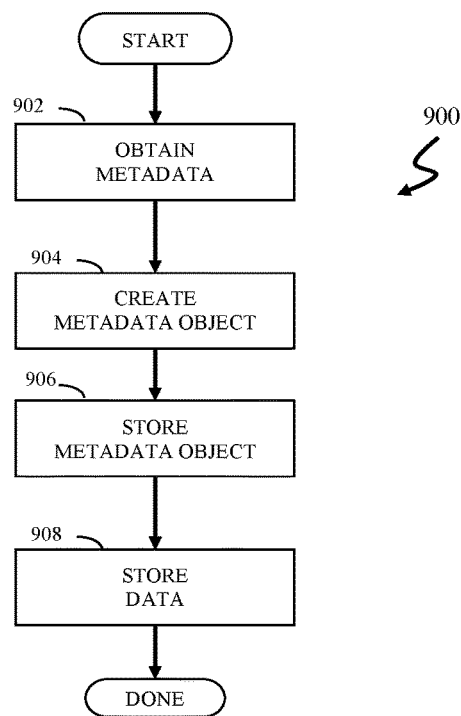
FIG. 9 is a flow diagram illustrating processing performed in connection with archiving data by separately archiving metadata and data according to an embodiment of the system described herein.

Referring to FIG. 9, a flow diagram 900 illustrates processing performed in connection with archiving a data, such as z/OS data, according to an embodiment of the system described herein. The data may be archived using the appliance 802 and the cloud service 160'. The data may correspond to a dataset (file), a volume (UCB), or some other increment of data. Processing begins at a step 902, where the system obtains metadata for the data being archived. The metadata may include a volume table-of-contents (VTOC) if the data being archived is a volume, along with information such as a type of device, size of the data (which may indicate a size of the device in the case of a volume), device information such as the device label and ccuu, the VSAM volume data set, etc.

Following the step 902 is a step 904 where the system creates a metadata object using the metadata obtained at the step 902. Following the step 904 is a step 906 where the system stores the metadata object. In an embodiment of the system described herein, the system stores the metadata object using the appliance 802 and the cloud service 160', although in other embodiments it is possible to store the metadata object directly from the host 110' directly to the cloud service 160' or to some other location. Following the step 906 is a step 908 where that data is stored. As with the metadata, the data may be stored on the cloud service 160' using the appliance 802 or may be stored in another location. Note that storing the data at the step 908 is provided according to the metadata, which may indicate a size of the data along with possibly other data characteristics of the data. Following the step 908, processing is complete.

Figure 10:
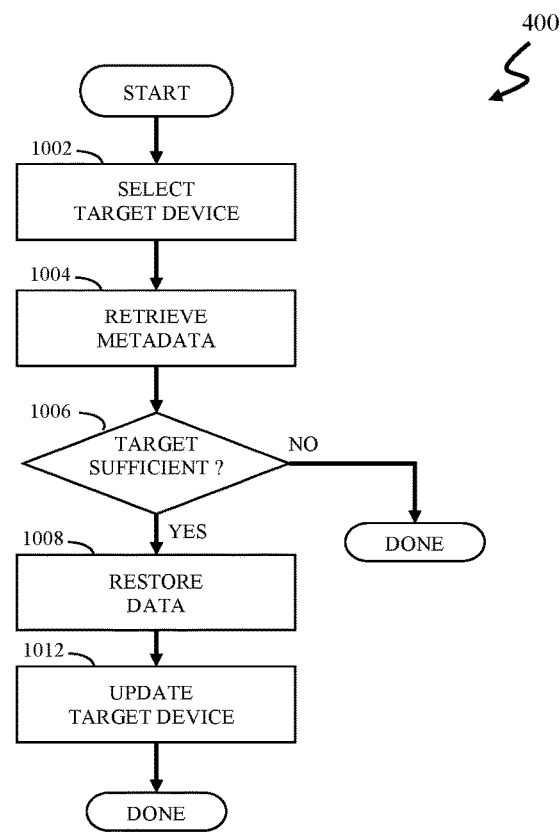
FIG. 10 is a flow diagram illustrating processing performed in connection with restoring data that was archived by separately archiving metadata and data according to an embodiment of the system described herein.

Referring to FIG. 10, a flow diagram illustrates restoring data that had been previously archived by separately storing metadata and data, as described elsewhere herein. The data may be a volume (UCB), a single dataset, or some other appropriate increment of data. Processing begins at a first step 1002 where a target device is selected for restoring the data. The target device may be any appropriate storage device, such as the storage device 150', described elsewhere herein. Following the step 1002 is a step 1004 where the metadata corresponding to the data being restored is retrieved. Following the step 1004 is a test step 1006 where it is determined if the target device, selected at the step 1002, is sufficient for restoring the data, based on the metadata retrieved at the step 1004. Reasons why the target device might not be sufficient include, for example, the target device being smaller than the data being restored (e.g., the data being restored is 2 TB, but the target device is only 1 TB). Other possibilities include other characteristics set forth in the metadata.

If it is determined at the test step 1006 that the target device is not sufficient, then processing is complete. Otherwise, control transfers from the test step 1006 to a step 1008 where the data is restored to the target device. Following the step 1008 is a step 1012 where additional information from the metadata (retrieved at the step 1004) is used to update the target device. The additional information could include, for example, a volume label. Following the step 1012, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of accessing a portion of data that was previously migrated from a storage device to a cloud service, the method being executed by one or more processors and comprising:
    initiating a recall of the data from the cloud service in response to the data residing entirely on the cloud service;
    determining if the portion of the data is stored on the storage device;
    retrieving cloud objects from the cloud service corresponding to the portion of the data in response to the portion of the data being unavailable on the storage device, wherein the portion corresponds to data that is expected to be used based on detecting a discernable pattern with respect to how the data is being accessed; and
    a host accessing the portion of the data on the storage device while cloud objects corresponding to other portions of the data are being transferred from the cloud service to the storage device as part of the recall.

2. A method, according to claim 1, wherein a host accesses the storage device to obtain the portion of data.

3. A method, according to claim 2, wherein the host receives a migrated status indicator in response to the data existing entirely on the cloud service.

4. A method, according to claim 2, wherein software at the host intercepts access requests to determine if the portion of the data is stored on the storage device.

5. A method, according to claim 2, wherein initiating the recall includes modifying metadata to indicate that the data is available for access by the host.

6. A method, according to claim 1, wherein retrieving particular cloud objects includes prioritizing transfers of the particular cloud objects over transfers of other ones of the cloud objects.

7. A method, according to claim 1, wherein prior to retrieving cloud objects from the cloud service corresponding to the portion of the data, metadata objects are retrieved and used to determine particular objects at the cloud service corresponding to the portions of data.

8. A non-transitory computer readable medium containing software that, when executed by one or more processors, accesses a portion of data that was previously migrated from a storage device to a cloud service, the software comprising:
    executable code that initiates a recall of the data from the cloud service in response to the data residing entirely on the cloud service;
    executable code that determines if the portion of the data is stored on the storage device;
    executable code that retrieves cloud objects from the cloud service corresponding to the portion of the data in response to the portion of the data being unavailable on the storage device, wherein the portion corresponds to data that is expected to be used based on detecting a discernable pattern with respect to how the data is being accessed; and
    executable code that enables a host to access the portion of the data on the storage device while cloud objects corresponding to other portions of the data are being transferred from the cloud service to the storage device as part of the recall.

9. A non-transitory computer readable medium, according to claim 8, wherein a host accesses the storage device to obtain the portion of data.

10. A non-transitory computer readable medium, according to claim 9, wherein the host receives a migrated status indicator in response to the data existing entirely on the cloud service.

11. A non-transitory computer readable medium, according to claim 9, wherein software at the host intercepts access requests to determine if the portion of the data is stored on the storage device.

12. A non-transitory computer readable medium, according to claim 9, wherein initiating the recall includes modifying metadata to indicate that the data is available for access by the host.

13. A non-transitory computer readable medium, according to claim 8, wherein executable code that retrieves particular cloud objects prioritizes transfers of the particular cloud objects over transfers of other ones of the cloud objects.

14. A non-transitory computer readable medium, according to claim 8, wherein prior to retrieving cloud objects from the cloud service corresponding to the portion of the data, metadata objects are retrieved and used to determine particular objects at the cloud service corresponding to the portions of data.

15. A method, according to claim 1, wherein the discernable pattern corresponds to the data being accessed sequentially.

16. A non-transitory computer readable medium, according to claim 8, wherein the discernable pattern corresponds to the data being accessed sequentially.

* * * * *